United States Patent Office 2,863,418
Patented Dec. 9, 1958

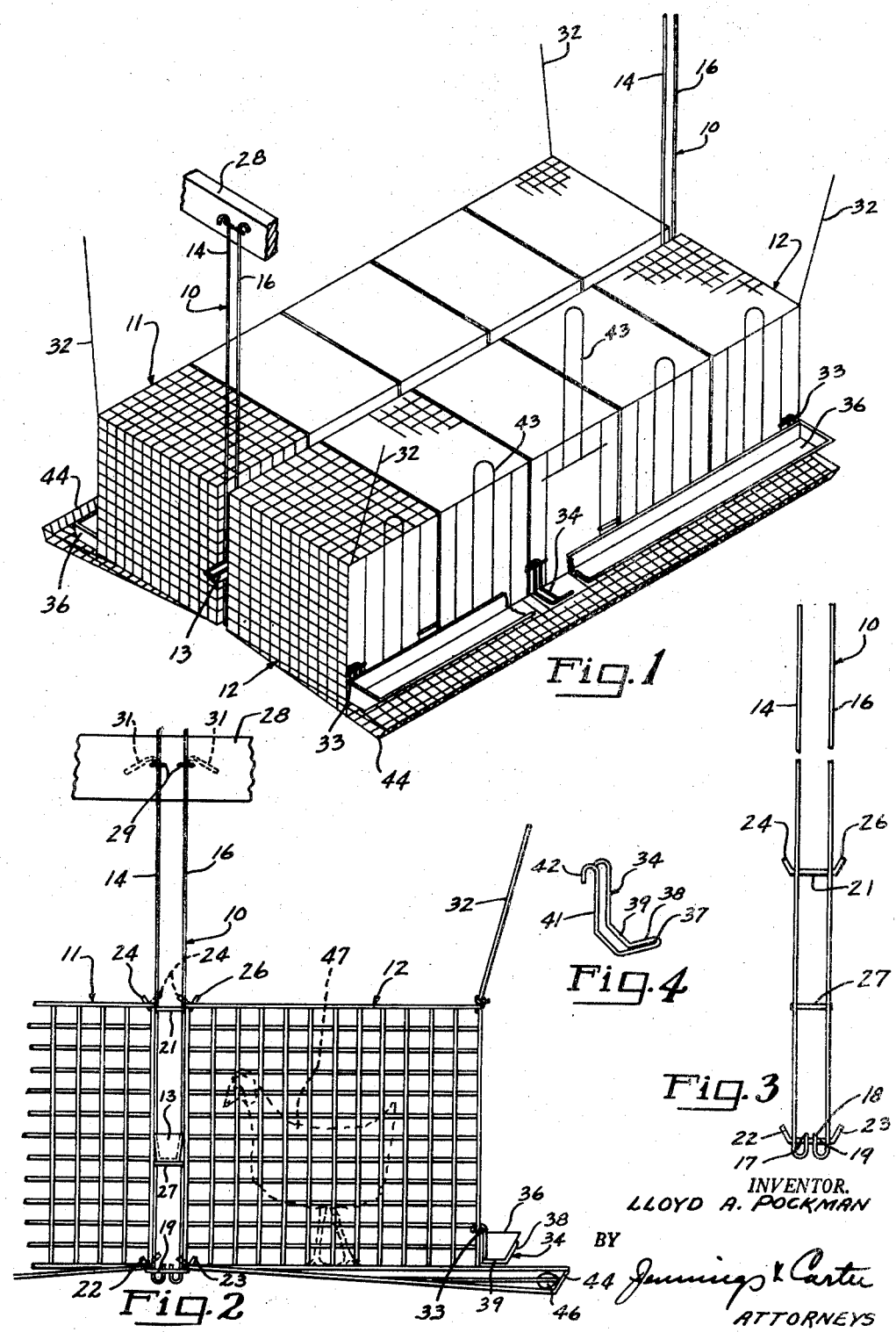

2,863,418
POULTRY LAYING CAGES
Lloyd A. Pockman, Decatur, Ala.

Application May 25, 1953, Serial No. 357,018

2 Claims. (Cl. 119—18)

This invention relates to poultry laying cages and has for an object the provision of simple means for mounting such cages in a minimum of space with a minimum of labor and materials.

Another object of my invention is to provide a device for mounting laying cages which shall be sturdy of construction and one which readily lends itself to mass production.

A further object of my invention is to provide a device for hanging laying cages from an overhead frame member which shall include means for supporting a water trough whereby the supporting means may be readily adjusted as to height and the trough levelled and tested before the installation of the cages.

A further object of my invention is to provide improved means for supporting an elongated feed trough at one side of the laying cages whereby the trough may be formed of lighter material and installed easier.

A still further object of my invention is to provide means for hanging a plurality of laying cages in a row arranged back to back, thus requiring a single water trough positioned between the cages in easy reach of the hens.

Heretofore in the art to which my invention relates difficulties have been encountered in the installation of laying cages, due to the fact that it is hard to install elongated water and feed troughs with the desired slope and maintain such troughs in position after installation. Also, such troughs are flimsy and often get out of alignment. Furthermore, the supporting means for laying cages, as heretofore employed, have usually consisted of wooden posts extending from the ground up which take up needed space, necessitate the spacing of the cages an undesirable distance apart, and being exposed to droppings and dampness, soon rot out.

To overcome the above and other difficulties, I provide wire hanger members joined together in pairs and supported from overhead thus leaving the floor free. Horizontally extending trough supports join the supporting wires and upturned members at each side thereof support the cages. The feed trough is supported along the front of the cages by a plurality of brackets attached to the cages and which extend beneath and upwardly along the outer surface of the trough to hold the same in position.

Laying cages together with water and feed troughs mounted in accordance with my invention are illustrated in the accompanying drawing forming a part of this application, in which:

Fig. 1 is a perspective view thereof, partly broken away and in section;

Fig. 2 is an end elevational view thereof;

Fig. 3 is an elevational view of the hanger for the cages and the water trough showing the cages removed; and, Fig. 4 is a perspective view showing one of the brackets employed to support the feed trough.

Referring now to the drawing for a better understanding of my invention I show hangers 10 for supporting wire laying cages 11 and 12 on opposite sides thereof with a water trough 13 therebetween. The hanger 10 is formed of parallel vertical wire members 14 and 16 spaced apart a distance to receive snugly therebetween the water trough 13. The lower ends of the wire members 14 and 16 are preferably bent up as at 17 and 18. Extending across and welded to the wire members 14 and 16 are a pair of vertically spaced cage support members 19 and 21. The ends of the cage support member 19 are bent up as at 22 and 23 so as to engage horizontally extending wires adjacent the bottoms of the cages 11 and 12. The ends of the cage support member 21 are bent upwardly as at 24 and 26 to engage horizontally extending wires adjacent the tops of the cages.

Extending between and welded to the wire members 14 and 16, intermediate the cage support members 19 and 21, is a horizontally extending trough support member 27. I have found in actual practice that No. 7 guage wire is satisfactory in every respect for the construction of the respective parts of the hanger 10.

To hang a plurality of cages to a horizontally extending member, such as an overhead joist 28, the upper ends of the wire members 14 and 16 are attached to the joist by means of staples 29. The individual hangers are then tapped up or down, as required, to position them so that the trough 13 has the required slope which is usually at the rate of approximately 1¼ inches for 100 feet. After positioning the water trough, the upper ends of the wire members 14 and 16 are bent over the staples as shown in dotted lines at 31 to hold them against shifting.

With the trough 13 positioned on the support members 27, the cages 11 and 12, which are usually constructed in groups of 5 or 6 individual cages, are attached to the hangers 10 by positioning the horizontally extending wires adjacent the bottoms and tops of the cages over the upwardly extending portions of the cage support members 19 and 21 respectively. The upwardly extending portions 22, 23, 24 and 26 are then bent over, as shown in dotted lines in Fig. 2, thus rigidly securing the cages to the hangers. Secured to the outer upper edges of the cages 11 and 12 are the lower ends of suspending wires 32. The upper ends of the suspending wires are connected to a suitable overhead frame member, such as the joist 28, thereby aiding in the support of the outer ends of the cages.

Fitting over horizontally extending wires 33 at the outer sides of the cages 11 and 12 are brackets 34 which support an elongated feed trough 36. Each support bracket 34 embodies a wire bent over as at 37 to form parallel members having forwardly and upwardly extending portions 38, horizontally extending portions 39 and vertically extending portions 41. The upper ends of the vertical portions 41 are bent over as at 42 so as to engage the horizontally extending wires 33. As shown in Fig. 2, the support brackets 34 are of a shape corresponding to that of the trough 36, thus adding strength to the trough as well as supporting the same.

The cages 11 and 12 are provided with the usual sliding doors 43. Extending outwardly of the cages 11 and 12 and beneath the feed trough 34 is a downwardly sloping egg ledge 44. The bottom of the egg ledge is spaced from the bottom of the trough 36 a distance to permit an egg indicated at 46 to roll toward the outer edge thereof, as shown in Fig. 2. By so positioning the trough 36 with respect to the egg ledge, the hen indicated at 47 cannot retrieve the egg thus permitting it to remain in a cool place until gathered.

From the foregoing it will be seen that I have devised an improved means for supporting poultry laying cages in a minimum of space with both the water and feed troughs in easy reach of the hens. By providing narrow wire hangers for the cages which permit the water trough to be installed between them, the watering trough is readily accessible to the hens. Also, the water troughs may be installed with the required slope easily and quickly, before the cages are hung. Furthermore, by supporting both the water and feed troughs with a snug fit adjacent opposite sides of the cages, the troughs do not get out of alignment and the cages are rigidly connected to each other.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a pair of poultry laying cages arranged back to back, of an overhead frame member, a pair of substantially parallel vertical wire members spaced apart to receive a water trough therebetween and disposed between the cages, horizontally extending trough support member secured rigidly to said vertical wire members, a water trough resting on said support member and fitting snugly between said vertical wire members, upper and lower outwardly and upwardly extending members on said vertical wire members disposed outwardly of the adjacent vertical wire member engaging the cages and supporting the same, and means attaching the upper ends of said vertical wires to said overhead frame member with the lower ends of the wires depending freely.

2. The combination with a pair of poultry cage banks arranged back to back in spaced relation, of an overhead structure, and a plurality of devices for suspending said cage banks from said overhead structure, each said device comprising a pair of substantially parallel vertical wire members spaced apart to receive a water trough therebetween and disposed between said cage banks; and each said device including a horizontally extending trough support member secured rigidly to and extending between said vertical wire members, outwardly and upwardly extending members fixed to said vertical wire members below said support member, engaging the cage banks and supporting the same, and means located above said support member securing said cage banks to said vertical wire members; a water trough resting on each said support member between said cage banks and fitting snugly between said vertical wire members, and means adjustably suspending said vertical wire members at their upper ends from said overhead structure with the lower ends of said vertical wire members depending freely therefrom.

References Cited in the file of this patent

UNITED STATES PATENTS

| | | |
|---|---|---|
| 824,222 | Warren | June 26, 1906 |
| 1,196,085 | Cole | Aug. 29, 1916 |
| 1,495,269 | Stewart | May 27, 1924 |
| 1,989,025 | Pronske et al. | Jan. 22, 1935 |
| 2,105,058 | Smith et al. | Jan. 11, 1938 |
| 2,603,441 | Emmart | July 15, 1952 |
| 2,612,862 | Ipsen | Oct. 7, 1952 |

FOREIGN PATENTS

| | | |
|---|---|---|
| 445,440 | Great Britain | Apr. 9, 1936 |
| 445,449 | Great Britain | Apr. 9, 1936 |